Sept. 20, 1927.

H. W. THOMPSON

METAL LATHE

Filed April 10, 1922

Inventor:
HORACE W. THOMPSON

By
Frank L. Sessions
Attorney.

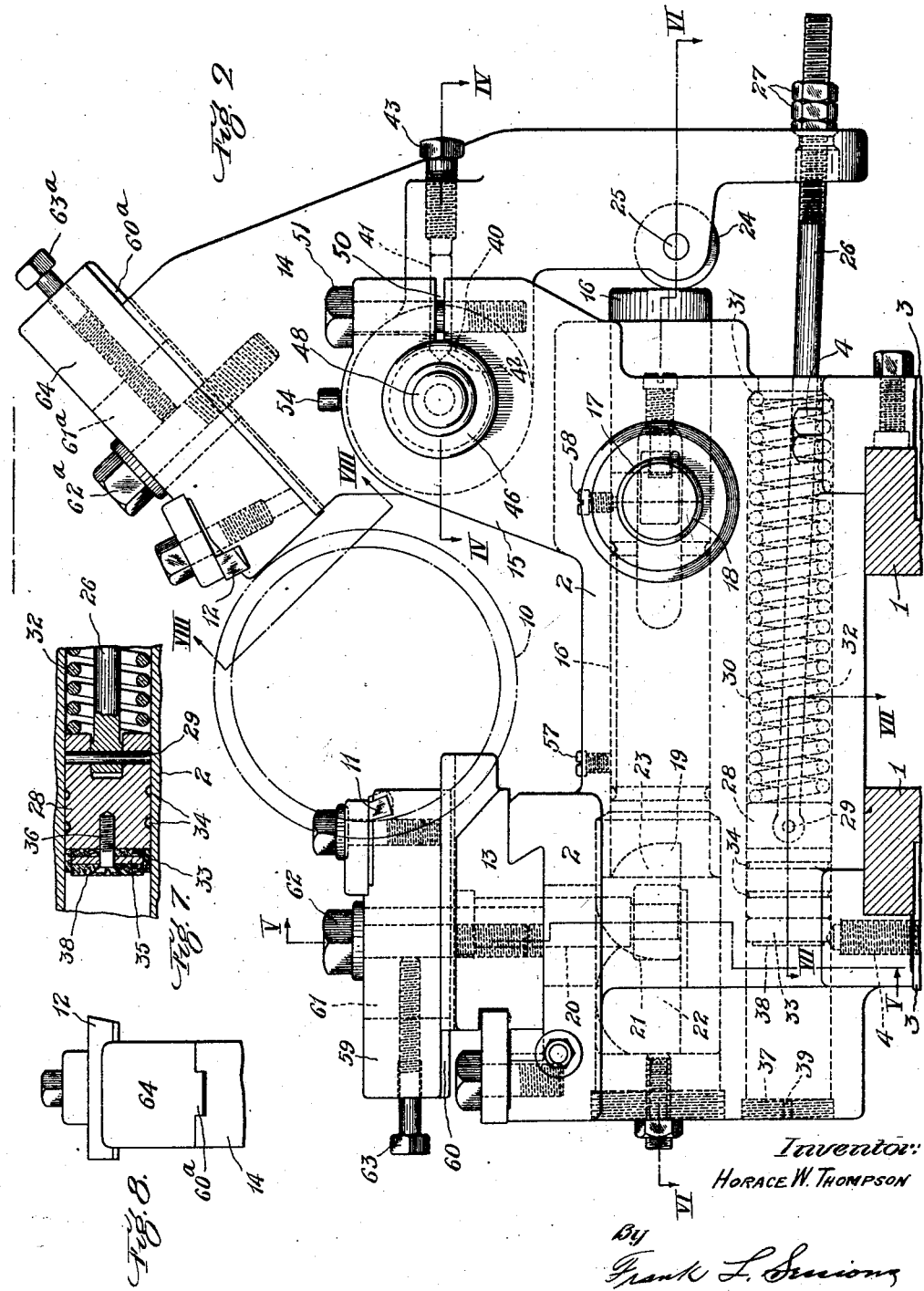

Sept. 20 1927.
H. W. THOMPSON
1,642,909
METAL LATHE
Filed April 10, 1922
4 Sheets-Sheet 3
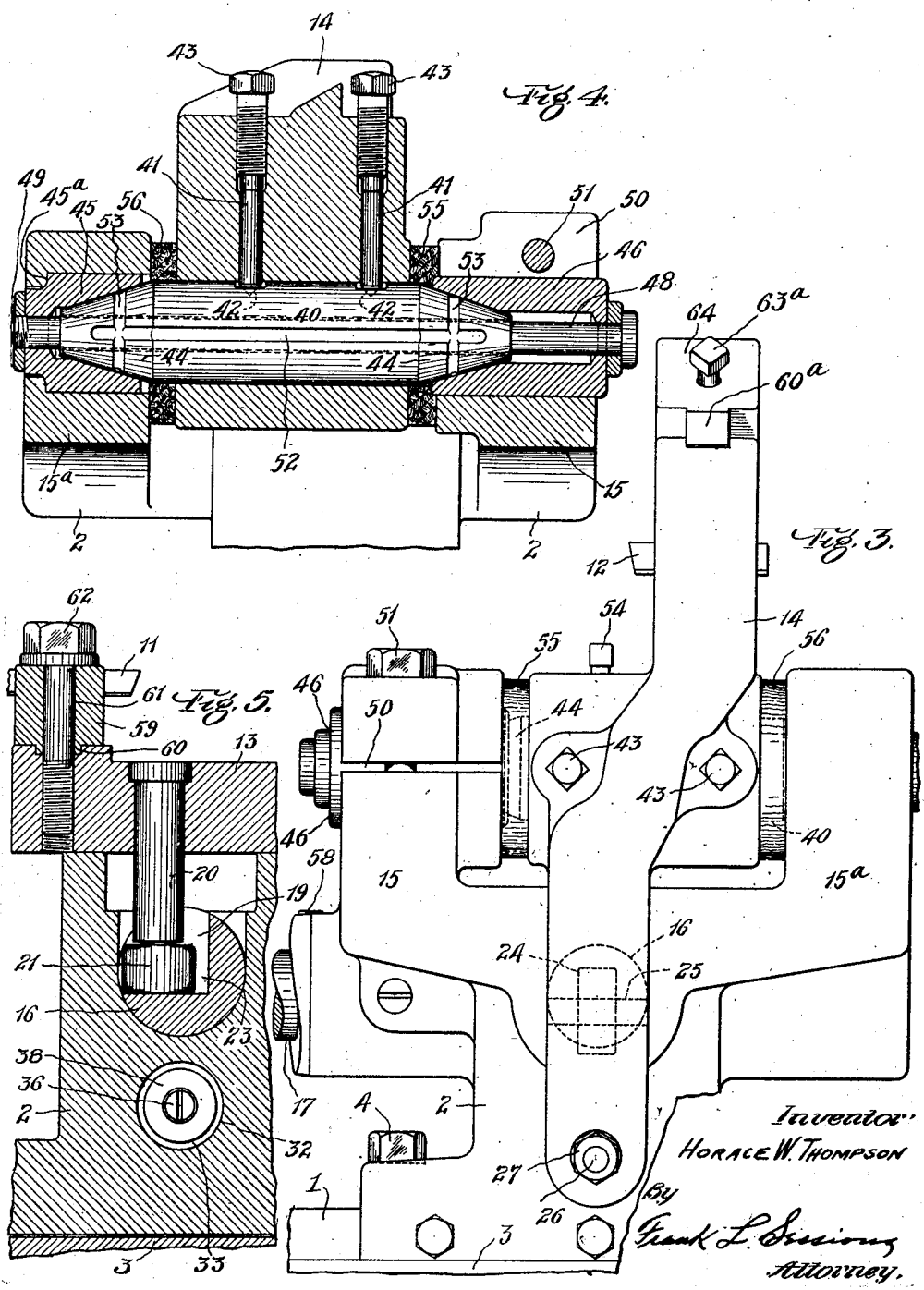

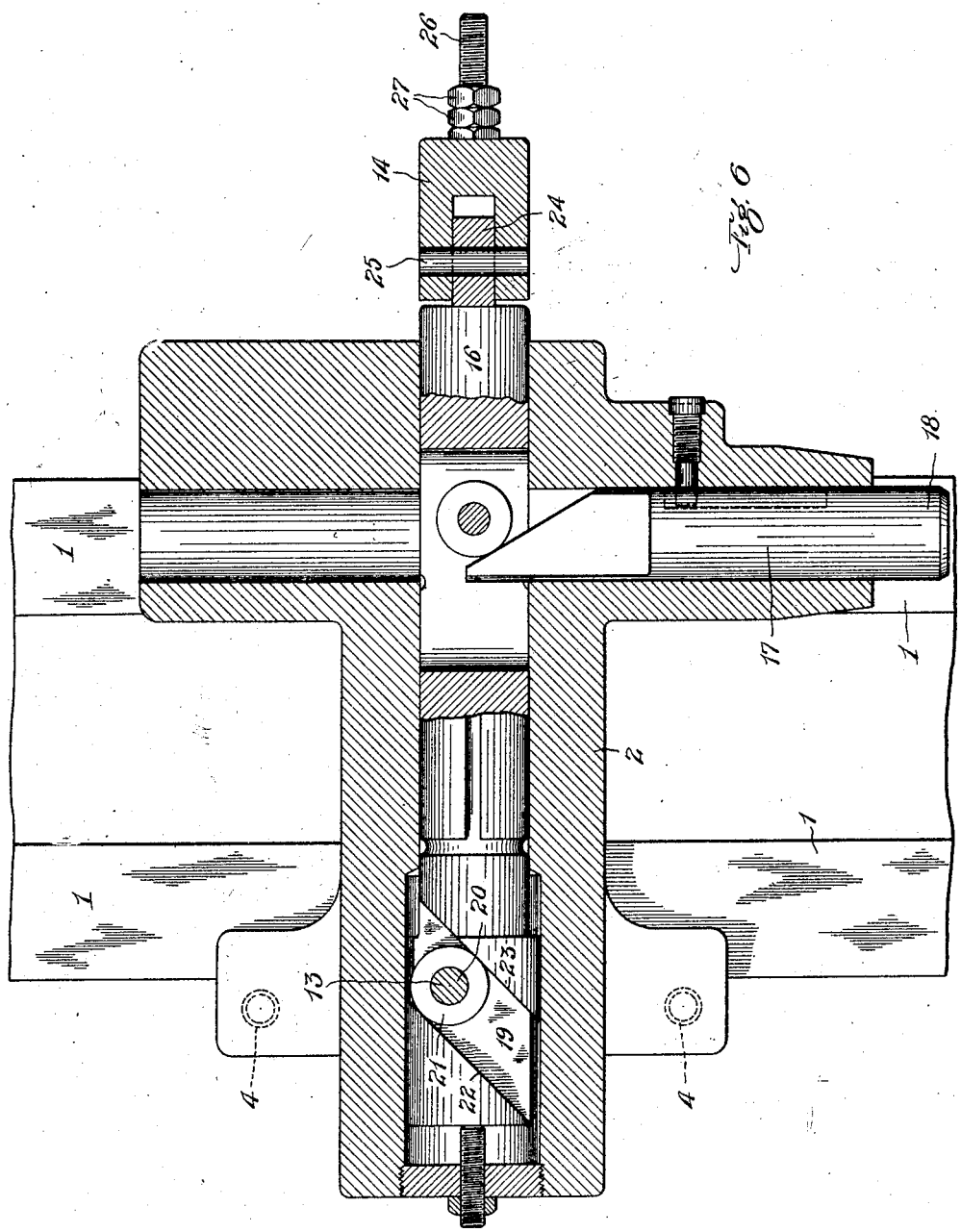

Patented Sept. 20, 1927.

1,642,909

UNITED STATES PATENT OFFICE.

HORACE W. THOMPSON, OF EAST CLEVELAND, OHIO, ASSIGNOR TO BARDONS & OLIVER, OF CLEVELAND, OHIO, A PARTNERSHIP COMPOSED OF JOHN G. OLIVER AND RAYMOND T. CRAGIN.

METAL LATHE.

Application filed April 10, 1922. Serial No. 551,128.

My invention relates to metal lathes and has particular reference to devices for performing certain boring and facing operations upon the work which a lathe or turret machine as ordinarily constructed without my improvement cannot perform.

The object of my invention is to provide means for boring and facing the work while it is being rotated by the spindle of the lathe and causing the feed of both the boring and facing tools by movement of the turret rather than by separate and independently operated cross feeding means such as have heretofore been employed in turret machines with which I am familiar. Another object of my invention is to provide means for boring and facing the rear end of the work while it is mounted upon and being rotated by the lathe spindle. Another object of my invention is to provide means for boring and facing the work at a considerable radial distance from the axis of rotation. These and other objects are attained by the use of my invention described in this specification and shown in the accompanying drawings in which—

Fig. 2 is an elevation of my boring and facing fixture as viewed from the turret end of the machine upon which it is mounted;

Fig. 3 is a side elevation of the facing fixture;

Fig. 4 is a fragmentary section on line IV—IV of Fig. 2;

Fig. 5 is a fragmentary section on line V—V of Fig. 1;

Fig. 6 is a section on line VI—VI of Fig. 2;

Fig. 7 is a fragmentary section on line VII—VII of Fig. 2; and

Fig. 8 is a fragmentary elevation viewed from line VIII—VIII of Fig. 2.

Figure 1:
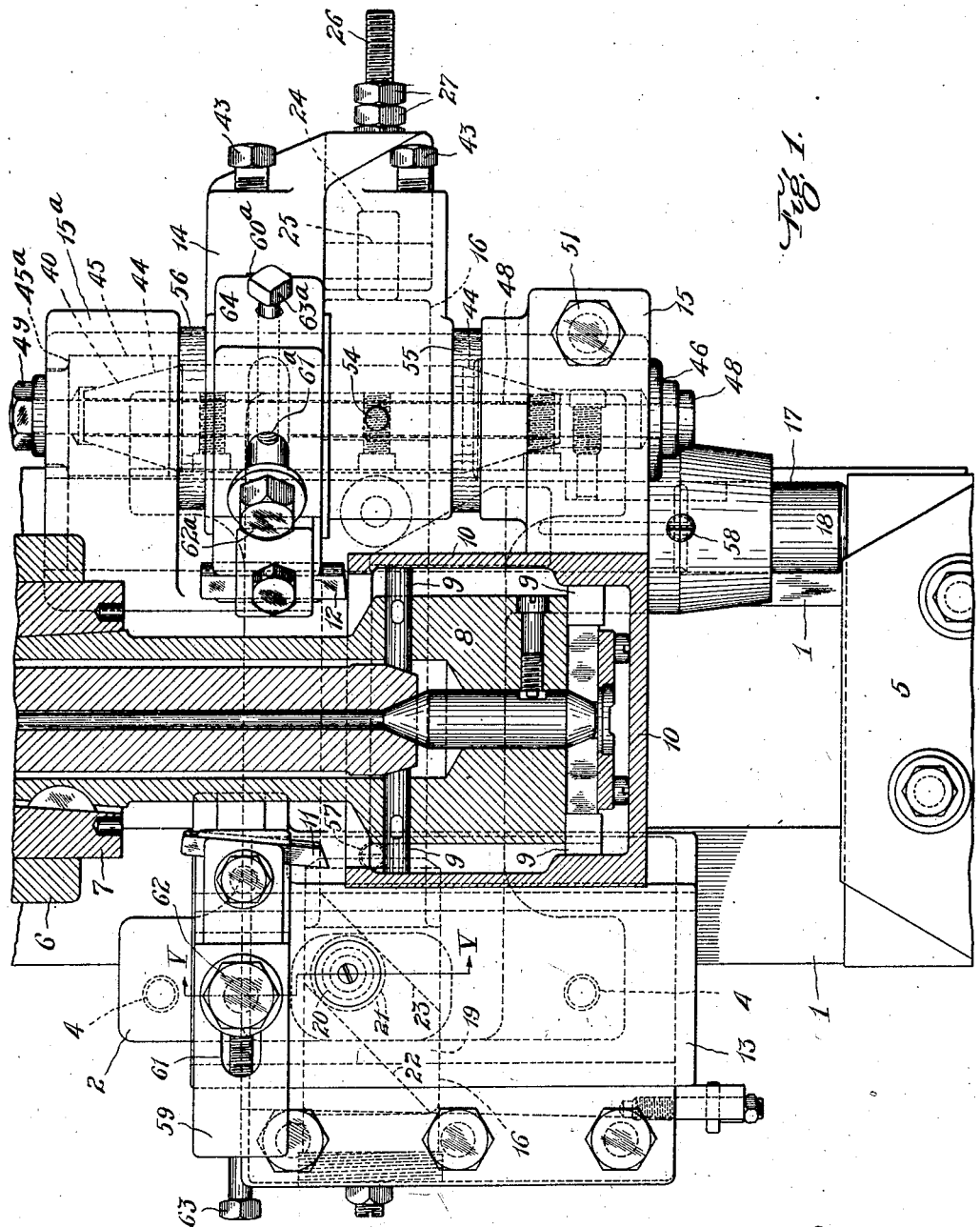
Fig. 1 is a top plan view of my invention showing the work, chuck and lathe spindle in section.

In carrying out my invention I substitute for the regular cut-off tool saddle a special saddle adapted to slide upon and be anchored to the lathe bed, the mounting being similar to that of the regular cut-off tool saddle. Upon this special saddle I mount my boring and facing tool supports and cause them to be fed preferably by the forward feeding movement of the turret. Both the boring and facing operations may thus be performed simultaneously by power received from the regular feeding movement of the turret.

In these specifications the term "longitudinal" means in the lengthwise direction of, and the term "transverse" means transverse to or cross-wise of, the lathe bed or of the axis of the lathe.

Referring to the drawings, the main bed of the lathe is shown at 1. Upon this bed there is slidably mounted the boring and facing fixture saddle, 2. Clamps, 3, and bolts, 4, may be provided for anchoring the saddle to the lathe bed. A fragmentary portion of the turret is shown at 5. 6 is the lathe spindle head, 7 is the chuck adapter, 8 is the chuck body, 9 are the chuck jaws and 10 is the work which is being machined. The work, 10, shown in the drawings is an engine piston which is mounted for rotation with the lathe spindle upon an expanding jaw chuck. 11 is the boring tool and 12 the facing tool for boring and facing the rear end of the work. The boring tool, 11, is secured in a tool holder which is secured to a tool support, 13, which is mounted for longitudinal movements upon the saddle, 2. The facing tool, 12, is secured in a tool holder which is secured to another tool support, 14, which is a rocker arm pivotally mounted for rotation in a plane transverse to the axis of the lathe, upon supports, 15, 15ª, carried by the saddle, 2. The tool, 12, is thus mounted for transverse movements upon the saddle, 2.

The means for feeding the boring and facing tool, 11 and 12 comprises a feed bar, 16, which is slidably mounted for movements transverse to the axis of the lathe in saddle, 2, and a longitudinally sliding bar, 17, which is also slidably mounted in saddle, 2. The transervely sliding feed bar, 16, is adapted to engage portions of the slide, 13, and rocker arm, 14, or means connected with them so that a movement of the feed bar, 16, produces feeding movements of the boring and facing tools, 11 and 12. The longitudinally sliding bar, 17, is adapted to engage feed bar, 16, or means connected therewith to cause the bar, 16, to slide in its support and impart feeding movements to the boring and facing tools. One end, 18, of bar, 17, projects outwardly from the saddle member toward the turret and is adapted to be engaged by the turret in its feeding movement and to be moved thereby longitudinally of the lathe. The movement of the turret, therefore, imparts feeding movements to the boring and facing tools.

While the feed bar, 16, may be made of various shapes, dimensions and proportions to meet the requirements of the service it is to perform it is shown in the drawings as round in cross section. Bar, 16, is provided with a transverse cam slot, 19, directly underneath the tool support or slide, 13. Secured to slide, 13, and extending downwardly therefrom into cam slot, 19, is a pin or stud, 20, preferably carrying a roller, 21, upon its lower end. The roller, 21, is adapted to be engaged by the sides, 22 and 23, of the cam slot, 19, when feed bar, 16, is actuated and the slide, 13, and the tool, 11, which is secured to it are thereby caused to move longitudinally of the axis of the lathe by the movement of feed bar, 16, transversely of the axis of the lathe.

The rocker arm, 14, is provided with a roller, 24, pivotally mounted at 25. Roller, 24, is adapted to be engaged by the end of feed bar, 16, so that movement of feed bar, 16, in one direction causes the rocker arm, 14, to rotate about its fulcrum, 15, and to impart a feeding movement to tool, 12.

As shown in the drawings, movement of the turret, 5, toward the head stock of the lathe will, when the bar, 17, is engaged by the turret, cause the boring tool, 11, to be fed longitudinally and the facing tool, 12, to be fed transversely of the lathe.

Suitable means may be povided to return the tools, 11 and 12, to their starting positions. The means which I prefer to employ for this purpose comprises the connecting rod, 26, which is adjustably secured to the lower end of rocker arm, 14, by nuts, 27, and which is connected to a plunger, 28, by the pin, 29. The plunger, 28, is slidably mounted in an aperture, 32, extending transversely of the lathe axis in saddle, 2. A spring, 30, may be provided to act upon plunger, 28, and react upon a shoulder, 31, in the aperture, 32, to pull upon rod, 26, to return the facing tool rocker-arm, 14, to its original or starting position and in doing so to move feed bar, 16, in a direction to cause the retraction of the boring tool slide, 13, by reason of the cam face, 23, engaging roller, 21, when the feed bar, 16, is forced back into its aperture or guide by the roller, 24.

To cushion the retractive effort of the spring, 30, the plunger, 28, may be provided with a suitable packing washer, 33. A fragmentary detail of the mounting of the plunger, 28, is shown in Fig. 7. Lubricant grooves, 34, may be provided in this plunger. The packing cup washer, 33, may be held in place on the end of plunger, 28, by a metal washer, 35, and screw, 36. To prevent undue shock to the mechanism should the spring, 30, force the plunger, 28, against the end of plug, 37, in aperture, 32, a leather disk, 38, may be secured to the end of plunger, 28, in the manner shown in Fig. 7. The plunger, 28, with or without its leather or other packing washers in aperture, 32, may thus be utilized as a dash-pot to check the retracting force of spring, 30. A vent hole, 39, may be provided in plug, 37, the size of the vent hole being made such that the air confined in front of the moving plunger, 28, will offer the desired resistance to the spring, 30.

It is obviously important that the rocker arm, 14, be firmly supported upon its pivot bearings in order that the facing tool, 12, may be accurately guided in its feeding movements. For this purpose I prefer to employ the type of bearing shown in Fig. 4. In this construction the rocker arm, 14, is mounted upon and secured to a fulcrum pin, 40, the securing means being cone pointed pins, 41, having their points securely held in counter sunk holes, 42, in the fulcrum pin, 40, by means of set screws, 43. Fulcrum pin, 40, is preferably made with conical ends forming trunnions upon rocker arm, 14, as shown at 44. Bearing thimbles, 45 and 46, accurately fitting apertures in the saddle, 2, may be provided for supporting the fulcrum pin, 40, upon its cone shaped trunnion ends. To adjust the bearings of fulcrum pin, 40, the thimble, 46, may be made axially movable in its support, 15, which as shown is a part of saddle, 2. The aperture in support, 15$^a$, may have an annular shoulder, 45$^a$, adapted to take the end thrust of bearing, 45, as shown in Fig. 4. Adjustment of the bearings is secured by means of a bolt, 48, which extends through axial apertures in fulcrum pin, 40, and bearings, 45 and 46, and has a threaded nut, 49, at one end.

To hold the bearing thimble, 46, in adjusted position, the support, 15, which forms part of saddle, 2, may be split as shown at 50 and tightly clamped about thimble, 46, by means of a cap screw such as is shown at 51. The fulcrum pin, 40, is preferably provided with longitudinal oil channels such as are shown at 52 and circumferential oil grooves such as are shown at 53. Means for oiling the fulcrum pin bearings may be provided as shown at 54.

55, 56 are felt or other fibrous material washers for retaining lubricant and for excluding dust and metal chips from the rocker arm bearings.

Means for oiling feed bar, 16, and longitudinal bar, 17, may be provided as shown at 57 and 58 respectively.

The means which I prefer to employ for adjusting and securing the boring tool, 11, in position comprises the tool holder, 59, which is provided with a tongue, 60, which fits in a corresponding groove and accurately guides the tool holder, 59, in movements transverse to the lathe axis. The tool holder, 59, is provided with a slot, 61, through which passes a clamping cap screw, 62, which is screwed into the slide, 13, and is adapted to hold the tool holder, 59, in any adjusted position. A set screw, 63, in a suitably threaded hole in the tool holder, 59, and abutting against cap screw, 62, may be employed to adjust tool holder, 59, to the position desired. In a similar manner the facing tool holder, 64, may be adjusted upon and secured to the rocker arm, 14, through the agencies of tongue, 60ª, slot 61ª, cap screw, 62ª, and set screw, 63ª.

While I have shown my invention adapted to machine only one class of work, it will be apparent to those skilled in the art that many other objects of various shapes may be advantageously machined in turret machines embodying my invention. The use of my invention does not interfere with the full use of the turret tools. In fact, the boring and facing operations, which my invention effects at a considerable distance radially from the center of the work, cannot be accomplished by turret tools but can readily be accomplished by the use of my invention at the same time that any one of the turret tools is performing another operation.

Having thus described my invention I claim:

1. In a lathe, the combination of the lathe spindle, means for securing the work thereto for rotation therewith, a saddle mounted upon the lathe, a longitudinally movable tool support mounted on said saddle, a second tool support pivoted to said saddle for movement in a plane transverse to the axis of said lathe, and a feed bar mounted on said saddle engaging said tool supports adapted when operated to impart simultaneous tool-feeding movements to said tool supports.

2. In a lathe, the combination of the lathe spindle, means for securing the work thereto for rotation therewith, a turret mounted on said lathe, turret-feeding means, a saddle mounted upon said lathe, a longitudinally movable tool support mounted on said saddle, a transversely movable tool support mounted on said saddle, tool-feeding means carried by said saddle for engaging said tool supports and imparting tool-feeding movements thereto, and means carried by said saddle adapted to be engaged by said turret when the latter is moved by said turret-feeding means, engage said tool-feeding means and impart tool-feeding movements to said tool supports.

3. A boring and facing device for lathes comprising a saddle adapted to be mounted upon a lathe, a longitudinally movable tool support mounted on said saddle, a second tool support pivoted to said saddle for movements in a plane transverse to the axis of the lathe upon which said saddle may be mounted, and a sliding feed bar mounted on said saddle engaging said tool supports for imparting simultaneous tool-feeding movements to said tool supports.

4. A boring and facing device for lathes comprising a saddle adapted to be mounted upon a lathe, a longitudinally movable tool support mounted on said saddle, a second tool support pivoted to said saddle for movements in a plane transverse to the axis of the lathe upon which said saddle may be mounted, and means for imparting tool-feeding movements to said supports said means comprising a tool-feeding member slidably mounted for movement in said saddle and engaging both of said tool supports, and an actuating member slidably mounted for movement in said saddle and having a cam engaging said tool-feeding member whereby movement of said actuating member may be imparted to said tool-feeding member to cause feeding-movements of said tool supports.

5. In a boring and facing device of the class described, a saddle adapted to be mounted upon a lathe, a facing-tool-support comprising a rocker arm having tapered trunnions, bearing thimbles mounted in apertures in said saddle, said bearing thimbles having tapered apertures adapted to receive said tapered trunnions, one of said bearing thimbles being axially movable in said saddle, and means extending axially through said trunnions and said bearing thimbles adapted to draw and hold them together.

6. In a boring and facing device of the class described, a saddle adapted to be mounted upon a lathe, a facing-tool-support comprising a rocker arm having tapered trunnions, bearing thimbles mounted in apertures in said saddle, said bearing thimbles having tapered apertures adapted to receive said tapered trunnions, one of said bearing thimbles being axially movable in said saddle, means extending axially through said trunnions and said bearing thimbles adapted to draw and hold them together, and means for securing said bearing thimbles in adjusted position.

In testimony whereof I affix my signature.

HORACE W. THOMPSON.